(12) United States Patent
Dutil et al.

(10) Patent No.: US 9,671,007 B2
(45) Date of Patent: Jun. 6, 2017

(54) LOW NOISE PULLEY

(71) Applicants: Kevin G. Dutil, Bentonville, AR (US); James Kevin Lindstrom, Springdale, AR (US); Zachary Fittro, Rogers, AR (US); Jeffrey A. Swane, Nixa, MO (US); Donald B. Brown, Fayetteville, AR (US); Robert James Crist, Bentonville, AR (US)

(72) Inventors: Kevin G. Dutil, Bentonville, AR (US); James Kevin Lindstrom, Springdale, AR (US); Zachary Fittro, Rogers, AR (US); Jeffrey A. Swane, Nixa, MO (US); Donald B. Brown, Fayetteville, AR (US); Robert James Crist, Bentonville, AR (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 278 days.

(21) Appl. No.: 14/139,341

(22) Filed: Dec. 23, 2013

(65) Prior Publication Data

US 2014/0121050 A1 May 1, 2014

Related U.S. Application Data

(62) Division of application No. 12/792,003, filed on Jun. 2, 2010, now Pat. No. 8,617,016.

(51) Int. Cl.
*F16H 55/40* (2006.01)
*F16H 55/36* (2006.01)

(52) U.S. Cl.
CPC ............ *F16H 55/40* (2013.01); *F16H 55/36* (2013.01); *Y10T 29/49453* (2015.01); *Y10T 29/49826* (2015.01)

(58) Field of Classification Search
CPC ........................................................ F16H 55/40
(Continued)

(56) References Cited

U.S. PATENT DOCUMENTS 2,878,852 A * 3/1959 Lippmann ........... B60C 11/0318
152/209.2
4,013,142 A * 3/1977 Hagg ..................... B66B 15/04
187/254
(Continued)

FOREIGN PATENT DOCUMENTS

CN 101210610 7/2008
EP 2083195 7/2009
(Continued)

OTHER PUBLICATIONS

KR, Final Rejection (with English translation); Patent Application No. 2012-7033674 (Nov. 20, 2015).
(Continued)

*Primary Examiner* — William E Dondero
*Assistant Examiner* — Mark K Buse
(74) *Attorney, Agent, or Firm* — Thompson Hine LLP (57) ABSTRACT

Low-noise pulleys and methods of constructing low-noise pulleys are disclosed. In a first aspect, first and second pluralities of arms extending radially outward from the outer hub to the outer rim are angularly offset from each other about the axis of rotation to eliminate symmetry across the lateral midline of the pulley. In a second aspect, the radially outermost ends of a plurality of arms are arcuately spaced apart according to a pitch sequence describing a pseudo-random pattern of relative spacings so as to reduce or eliminate rotational symmetry of the pulley. In a third aspect, features of the first and second aspects are combined, and in one embodiment, first and second pluralities of arms are, respectively, approximately oppositely canted so as to vary (Continued)

the arcuate spacings of the laterally outermost ends of the arms.

20 Claims, 9 Drawing Sheets

(58) Field of Classification Search
USPC .......................................................... 474/166
See application file for complete search history.

(56) References Cited

U.S. PATENT DOCUMENTS

| | | | |
|---|---|---|---|
| 4,289,183 A | | 9/1981 | Abe et al. |
| 4,316,589 A | * | 2/1982 | Stranders ............. G11B 23/021 242/341 |
| 4,717,370 A | | 1/1988 | Röhrig |
| 4,936,364 A | | 6/1990 | Kajiwara et al. |
| 4,973,292 A | * | 11/1990 | Mevissen ................ F16H 55/36 474/192 |
| 5,209,793 A | | 5/1993 | Cusimano, II |
| 5,630,769 A | * | 5/1997 | Schmidt .................... B60B 5/02 474/167 |
| RE35,535 E | | 6/1997 | Brumley et al. |
| 5,658,409 A | | 8/1997 | Kakumu |
| 5,709,440 A | | 1/1998 | Lecours |
| 5,759,311 A | | 6/1998 | Williams |
| 5,772,549 A | | 6/1998 | Berndt et al. |
| 5,974,872 A | | 11/1999 | Morishita et al. |
| 2004/0012285 A1 | | 1/2004 | Buening et al. |
| 2007/0232427 A1 | * | 10/2007 | Ueno ..................... F16H 55/48 474/199 |
| 2009/0191995 A1 | * | 7/2009 | Hamada ................... F16H 7/12 474/94 |
| 2010/0184548 A1 | * | 7/2010 | Langlois ............. B29C 45/0025 474/190 |
| 2014/0121050 A1 | * | 5/2014 | Dutil ....................... F16H 55/36 474/195 |

FOREIGN PATENT DOCUMENTS

| | | |
|---|---|---|
| JP | 03-223561 | 10/1991 |
| JP | 04102755 | 4/1992 |
| JP | 09174975 | 7/1997 |
| JP | 2001-090811 | 4/2001 |
| JP | 2004/239380 | 8/2004 |
| JP | 2006/316974 | 11/2006 |
| WO | 2008/156441 | 12/2008 |

OTHER PUBLICATIONS

CA, Examination Report issued Dec. 18, 2014 regarding Canadian Application No. 2,801,203.
CN, English Translation of the Notice of Reasons for Rejection issued Mar. 3, 2015 regarding Chinese Application No. 2013-513230.
EP, Examination Report issued Jan. 27, 2015 regarding European Application No. 11790215.5.
KR, Office Action (with English translation) issued Mar. 23, 2015 regarding Korean Application No. 2012-7033674.
PCT, International Search Report and Written Opinion, International Application No. PCT/US2011/038018 (Oct. 11, 2011).
AU, Patent Examination Report No. 1, Australian Application No. 2011261720 (Mar. 28, 2014).
EP, Search Report and Opinion, European Application No. 11790215.5 (Feb. 24, 2014).
US, Office Action (Restriction Requirement), U.S. Appl. No. 12/792,003 (Sep. 28, 2012).
US, Office Action, U.S. Appl. No. 12/792,003 (Dec. 21, 2012).
US, Office Action, U.S. Appl. No. 12/792,003 (Jun. 4, 2013).
US, Notice of Allowance, U.S. Appl. No. 12/792,003 (Aug. 27, 2013).
KR, Office Action, English translation of Korean Patent Application No. 2012-7033674 (Sep. 17, 2014).
CN, Search Report (with English translation); Patent Application No. 201180026848.6 (Sep. 24, 2015).
CN, Office Action; Patent Application No. 201180026848.6 (Oct. 9, 2015).
EP, European Search Report; Patent Application No. 11790215.5 (Mar. 22, 2016).
JP, Decision of Rejection; Patent Application No. 2013-513230 (Jan. 4, 2016).
US, Non-Final Office Action; U.S. Appl. No. 14/139,396 (Feb. 3, 2016).
CN, Notification on Grant of the Patent Right for Invention with English Translation; Chinese Patent Application No. 201180026848.6 (Sep. 20, 2016).
KR, Trial Decision with English Translation; Korean Patent Application No. 2012-7033674 (Nov. 22, 2016).
CN, Third Office Action with English Translation; Chinese Patent Application No. 201180026848.6 (Apr. 20, 2016).
EP, Examination Report, European Patent Application No. 11790215.5, 6 pages, Mar. 8, 2017.

* cited by examiner

LOW NOISE PULLEY

This application is a divisional application of prior U.S. patent application Ser. No. 12/792,003, filed Jun. 2, 2010, the entirety of which is incorporated by reference.

TECHNICAL FIELD

The present application relates generally to endless belt drive systems and, more particularly, to a drive system pulley having one or more sets of arms radiating outwardly from an outer hub portion to support an outer rim at varying arcuate spacings.

BACKGROUND

Pulleys for endless belt drive systems, whether flat pulleys, wedge pulleys, poly-V-ribbed pulleys, or the like, typically come in one of three basic forms: solid, profiled, or arm design. Smaller pulleys may be designed as solid pulleys, where an annular disk having approximately the same width as the pulley connects the hub to the outer rim. Larger pulleys are frequently designed as profiled or webbed pulleys, where an annular portion or web that is substantially narrower than the width of the pulley connects the hub to the outer rim. Still larger pulleys (or pulleys where the volume and/or weight of the pulley material is critical) tend to be designed as arm design pulleys, where a plurality of distinct and outwardly radiating arms, which may be designed as spokes, struts, ribs, or the like, connect the hub to the outer rim. The arms are usually, but not necessarily, separated from each other by inter-arm voids.

Arm design pulleys may be preferred for efficiency considerations, but create additional dynamic behaviors in high-capacity drive systems due to variations in the structural characteristics of the pulley rim. The belts in belt drive systems are tensioned so that friction between the outer rim of a pulley and the flanks and/or faces of the belt can efficiently transmit power within the system. However, belt tension tends to compress each pulley, at least along the pulley's winding arc, which slightly reduces the radius of the engaged running surface of the outer rim. In a solid or profiled pulley the structural characteristics of the outer rim and belt running surface remain essentially the same around the entire circumference of the pulley. Consequently, the outer rim can be considered to be rotationally uniform, and belt entry and exit conditions can frequently be considered to be quasi-static. Conversely, in an arm design pulley the portions of the outer rim that are in close proximity to the arms will be stiffer than the portions of the outer rim that bridge between arms, or, in other words, the running surface proximate to an arm will be comparatively resistant to compressive deformation, while the running surface remote from an arm will be comparatively susceptible to flexural deformation. Consequently, the outer rim is not rotationally uniform but rather rotationally variable, with changes in belt entry and exit conditions potentially generating audible vibrations in the pulley and/or the belt drive system. This variation in stiffness can be reduced by increasing the thickness of the outer rim, but at the cost of adding substantially more material to the pulley.

The dynamic behaviors of an arm design pulley can materially and undesirably contribute to the operating noise of the belt drive system. The arms in such a pulley most conventionally radiate outward from the hub to the outer rim, are structurally identical, and are separated from adjacent arms by equal angular spacings, so that the pulley exhibits n-fold rotational symmetry (with n being the number of arms in the pulley). Noise attributable to the aforementioned variation in the structural characteristics of the pulley, and amplified by the regular nature of that variation about the circumference of the outer rim, can manifest as an energetic peak or peaks in the noise spectrum of the belt drive system. The frequencies involved can be described by the following: frequency (Hz)=(order*RPM)/60, where the term "order" represents, for any particular structural characteristic or logically related class of characteristics of concern, the number of regularly recurring variations about the circumference of the pulley rim, and RPM is the rotational speed of the pulley. The structural characteristic, and thus "order," principally addressed herein is the number of arms connecting a hub to an outer rim, but other structural characteristics may be of concern, and may be addressed by the techniques described herein. For example, pulleys for endless belt drive systems are frequently manufactured from thermoplastics, thermosetting plastics, or moldable plastic composites, however the molding process can create unwanted variations in the running surface of the outer rim. Material in sections of the outer rim overlying or proximate to an arm will not flow, crystalize, and/or set in the same manner as material in sections of the outer rim bridging between arms. The Applicants have observed that the radius of the running surface of molded arm design pulleys tends to decrease or shrink proximate each arm during cooling due to the relative thickness of the underlying material. This regular variation in the running surface of the finished product can create or further exacerbate an order-driven energetic peak or peaks in the noise spectrum of the belt drive system, particularly during seating of the flanks and/or faces of the belt on the outer rim.

The Applicants have determined that operating noise attributable to variability in the structural characteristics of the outer rim and belt running surface, and specifically the amplitude of distinct peaks in the noise spectrum attributable to such variability, can be diminished by eliminating the lateral symmetry that is conventionally found in arm design pulleys. Sets of laterally asymmetric supporting arms can be offset from each other to create out of phase or intermittent vibrations which destructively interfere with simple modes of vibration caused by such variability. This operating noise can also be diminished by reducing or eliminating the rotational symmetry that is conventionally found in arm design pulleys. The outer ends of laterally symmetric arms (or laterally asymmetric sets of arms) can be separated by varying arcuate spacings about the outer rim to reduce the amplitude of any single mode of vibration, and pitch sequences can be selected to both pseudo-randomize the angular variability of the outer rim and reduce or eliminate the rotational symmetry of the pulley. Combinations of lateral asymmetry and reduced rotational symmetry can introduce further disorder into the running surface of an arm design pulley to further disrupt simple modes vibration. Accordingly, new low-noise pulley designs and new methods of constructing low-noise pulleys are presented.

SUMMARY

Pulleys and methods of constructing pulleys for endless belt drive systems are disclosed. In general, each pulley comprises an outer hub, an outer rim, and at least one plurality of arms extending radially outward from the outer hub to the outer rim. In a first aspect, the pulley includes first and second pluralities of arms, where the radially outermost ends of the first and second plurality of arms are, respectively, arcuately spaced apart at equal intervals. The arms of the second plurality of arms are angularly offset from the arms of the first plurality of arms about the axis of rotation such that arms from the respective pluralities alternate about the pulley. The arms of the respective pluralities are also oppositely disposed with respect to the lateral mid line of the pulley. In one embodiment, the respective pluralities of arms connect the outer hub to the outer rim predominantly on opposite sides of the lateral midline of the pulley. In another embodiment, the respective pluralities are oppositely canted with respect to the lateral midline of the pulley. In a related aspect, a method of constructing a low-noise pulley includes the steps of constructing first and second pluralities of arms, and angularly offsetting the arms of the second plurality of arms from the arms of the first plurality of arms about the axis of rotation to eliminate symmetry across the lateral midline of the pulley. In one variant of the method, the first plurality of arms are constructed so as to connect the outer hub to the outer rim predominantly on one side the lateral midline of the pulley, and the second plurality of arms are constructed so as to connect the outer hub to the outer rim predominantly on the opposite side the lateral midline of the pulley. In another variant of the method, the first and second pluralities of arms are constructed to be oppositely canted with respect to the lateral midline of the pulley.

In a second aspect, the radially outermost ends of proximate pairs of arms in a plurality of arms are arcuately spaced apart about the outer rim according to a pitch sequence describing a pseudo-random pattern of relative spacings. In a first embodiment, the pitch sequence reduces rotational symmetry in comparison to that which would be present if there was no variation in arcuate spacing. In a second embodiment, the pitch sequence eliminates rotational symmetry. In a related aspect, a method of constructing a low-noise pulley includes the steps of selecting a pitch sequence describing a pseudo-random pattern of relative spacings, and spacing the radially outermost ends of a plurality of arms radiating outward from an outer hub to an outer rim according to the selected pitch sequence. In a first variant of the method, the pitch sequence is selected so as to reduce rotational symmetry in comparison to that which would be present if there was no variation in arcuate spacing, while in another variant, the pitch sequence is selected so as to eliminate rotational symmetry of the pulley.

In a third aspect, features of the first and second aspects are combined. In one embodiment including first and second pluralities of arms, the radially outermost ends of proximate pairs of arms in the respective pluralities are arcuately spaced apart according to a pitch sequence describing a pseudo-random pattern of relative spacings, and the second plurality of arms is angularly offset from the arms of the first plurality of arms about the axis of rotation. In another embodiment including first and second pluralities of arms that are angularly offset about the axis of rotation, the arms of the first plurality of arms and the arms of the second plurality of arms are approximately oppositely canted with respect to the lateral midline of the pulley, with the canting of proximate pairs of arms being varied so as to vary the arcuate spacings between the vertices of V-shapes defined by proximate pairs of arms according to a pitch sequence describing a predetermined variation in that arcuate spacing. In a related aspect, a method of constructing a low-noise pulley combines the aforementioned methods.

DETAILED DESCRIPTION

Before disclosing several embodiments of the claimed invention in detail, it should be noted that claimed invention is not to be limited in its application or use to the particular details of construction and arrangements of parts illustrated in the accompanying drawings and description. The disclosures herein may be implemented or incorporated in other embodiments, variations, and modifications, and may be practiced or carried out in various ways. It will be understood that any one or more of the following-described embodiments, variations, and modifications can be combined with any one or more of the other following-described embodiments, variations, and modifications, etc. It will also be understood that although the application frequently makes reference to "a radius" or "the radius" of structures, the singular form of the term is used for convenience of description and explanation. Structures such as the running surface of a pulley may have complex profiles, so that description involving this term will be understood to mean a radius measured from essentially identical portions of the referenced structure or structures, e.g., the same relative location on a pulley running surface designed to engage a poly-V-ribbed drive belt. The term "arcuate spacing" is to be understood as referring to spacings measured in the same manner. The term "arcuate separation" is to be understood as referring to spacings measured about the outer rim, but only with respect to an "angular" component, i.e., a component in the direction of rotation, and neglecting any lateral component, i.e., a component transverse to the direction of rotation and parallel to the axis of rotation.

Figure 1A:
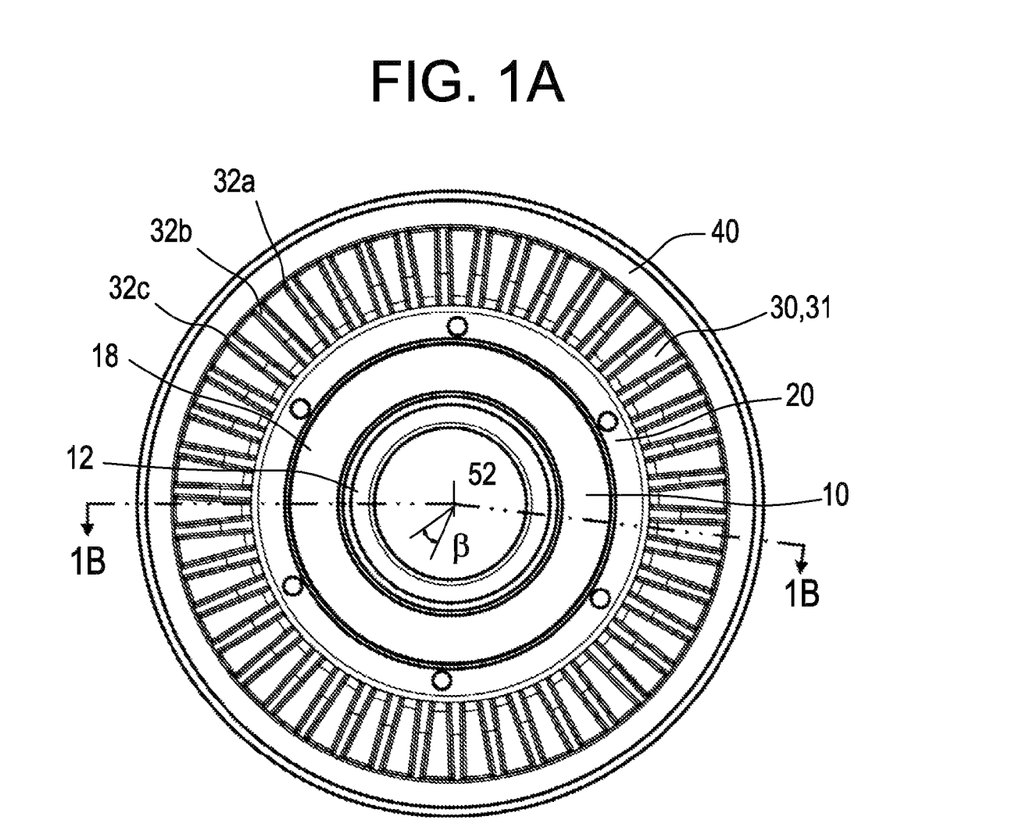
FIG. 1A is a side view of an arm design pulley of known design.
Figure 1B:
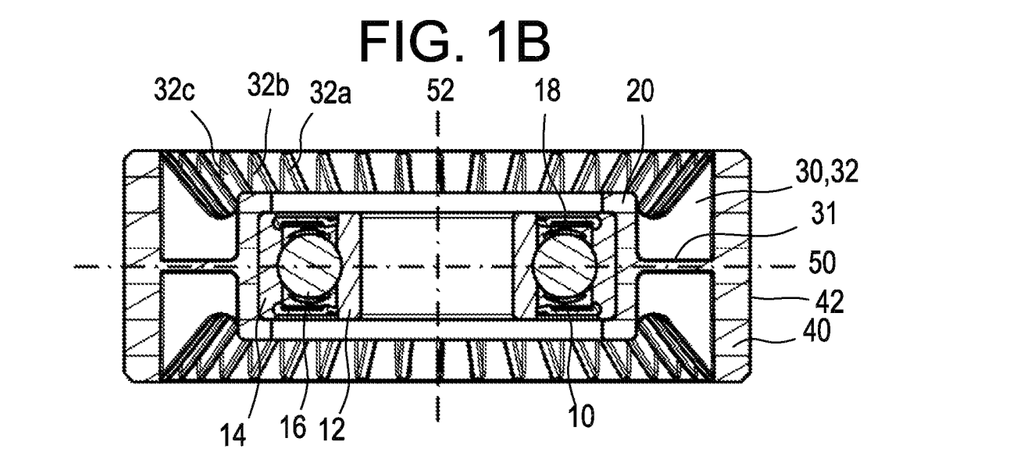
FIG. 1B is a cross-sectional view of the arm design pulley of FIG. 1A.

With initial reference to FIGS. 1A and 1B, an arm design pulley generally comprises three primary parts: an outer hub 20, which may house or be molded onto an inner hub 10, a support portion 30 including a plurality of arms 32 (including individual arms 32a, 32b, etc.), and an outer rim 40. If the pulley is an idler pulley, the inner hub 10 may be a ring bearing (as shown), including an inner race 12, an outer race 14, rolling elements 16, and a cage 18. If the pulley is a driving or driven pulley, the inner hub 10 may be or include a bushing, shaft clamp, dynamic damping device, etc. Those of skill in the art will appreciate that improvements described herein are compatible with molded arm design pulleys generally, and are not limited by the details of particular pulley-to-shaft mating structures. Similarly, if the pulley is a flat pulley, the outer rim 40 may simply provide a cylindrical running surface 42 (as shown); however if the pulley is a wedge pulley for use with V-belts the outer rim may further include a pair of radially projecting and laterally opposing flanges (not shown) for retaining the V-belt within the pulley groove, and the running surface 42 may constitute the inner flanks of the flanges. Similarly, if the pulley is a poly-V-ribbed pulley for use with poly-V belts, the outer rim may further include one or more circumferential ribs (not shown), and the running surface may constitute the flanks of the circumferential ribs as well as the inner flanks of any laterally opposing flanges. Again, those of skill in the art will appreciate that improvements described herein are compatible with molded arm design pulleys generally, and are not limited by the details of any particular outer rim configuration.

In the known design shown in FIGS. 1A and 1B, the arms 32 are radially extending, sheet-like ribs. As illustrated in the cross-section of FIG. 1B, the ribs may be interconnected within the support section 30 by an annular web of material 31, but are still considered to constitute arms for the purposes of this application. Such an annular web 31 is primarily intended to assist in the flow of material within a manufacturing mold, and provides only a minor contribution to the stiffness of the outer rim 40. The arms 32 are laterally symmetric, i.e., symmetric across the lateral midline 50 of the pulley (which, strictly speaking, is a plane perpendicular to the axis of rotation 52), and proximate pairs of arms 32a/32b, 32b/32c, etc. intersect the outer rim 40 with an equal arcuate spacing α between their radially outermost ends. In the illustrated design, forty two ribs 32 extend between the outer hub 20 and the outer rim 40, resulting in an angular spacing, β, of about 8.57 between proximate pairs of arms and an arcuate spacing, α, of about 0.150r between their radially outermost ends, where r is the radius from the outermost arm ends to the axis of rotation 52. The stiffness and/or diameter of the illustrated pulley varies over a complete cycle within these spacings, producing a "42nd order" vibration that is related to the rotational period of the pulley. Such a vibration, depending upon the characteristics of the belt, pulley-to-pulley belt lengths, the rotational speed of the pulley, etc., may also contribute to a harmonic resonance which results in an energetic peak in the noise spectrum of the belt drive system, and can manifest as another distinct noise component having a distinguishable audible pitch. Disrupting the vibration so as to distribute the dissipating energy among multiple frequencies, to reduce the energy in any system resonance, or to alter the pitch of any resonance will tend to reduce the amplitude of such noise components, to shift noise components to a less distinguishable or audible range of frequencies, or to otherwise redistribute the dissipating energy in a manner which better approximates the energy distribution in a frequency-distributed noise spectrum.

Figure 2A:
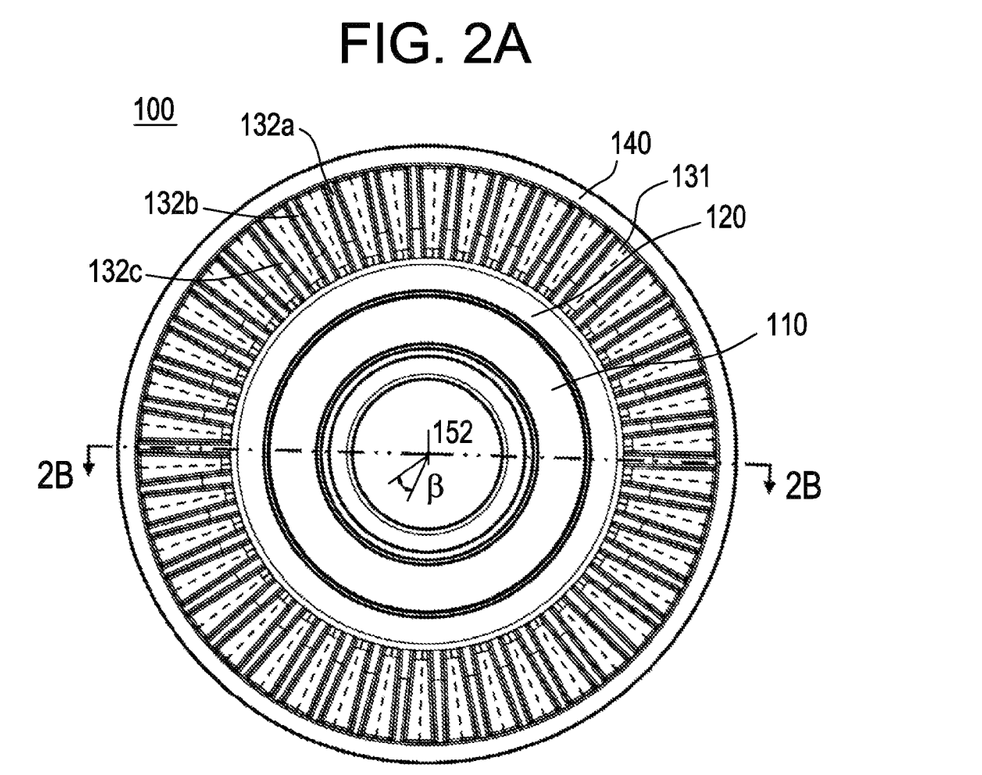
FIG. 2A is a side view of an arm design pulley having arms which are angularly offset across the lateral midline of the pulley. The positions of arms on the opposite side of the pulley are indicated by single phantom lines.
Figure 2B:
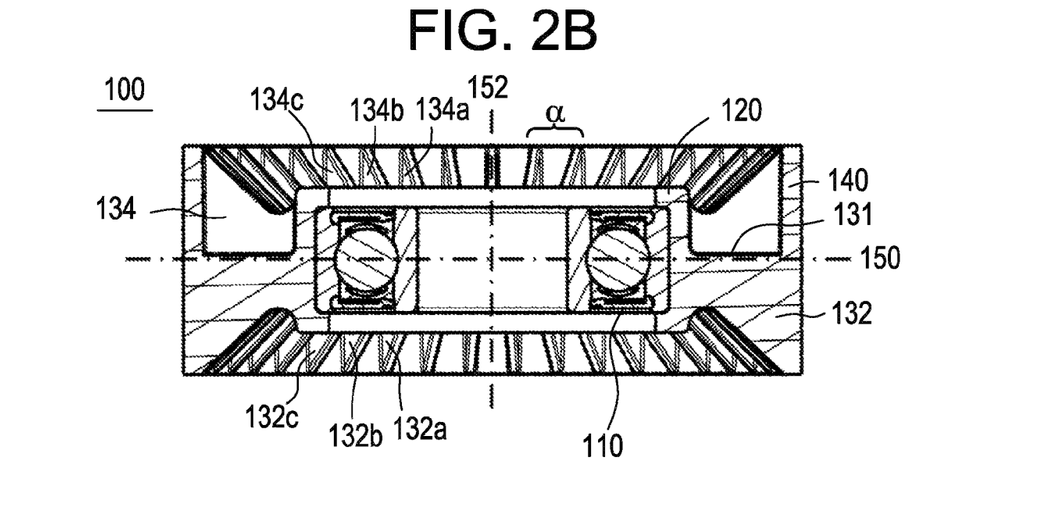
FIG. 2B is a cross-sectional view of the arm design pulley of FIG. 2A.

In a first embodiment shown in FIGS. 2A and 2B, a laterally asymmetric pulley 100 disrupts the aforementioned vibration by including two sets arms, angularly offset from each other with respect to the axis of rotation 152, which connect the outer hub to the outer rim on opposite sides of the midline of the pulley 150, respectively. The pulley 100 comprises an outer hub 120, a first plurality of arms 132, a second plurality of arms 134 equal in number to the first plurality of arms, and an outer rim 140. The pulley may include or receive an inner hub 110, such as the inner hub 10 discussed in the known design, but the particular construction of the inner hub 110 is not a critical limitation. The first plurality of arms 132 (including individual arms 132a, 132b, etc.) extend radially from the outer hub 120 to the outer rim 140, with the radially outermost ends of the arms being centered on one side of the lateral midline 150 of the pulley. The second plurality of arms 134 (including individual arms 134a, 134b, etc.) also extend radially from the outer hub 120 to the outer rim 140, with the radially outermost ends of the arms being centered on the opposite side of the lateral midline 150. The pluralities of arms 132 and 134 preferably constitute pluralities of ribs which are oriented perpendicularly to the lateral midline 150, but the arms may have other shapes, cross-sections, and orientations as well. The pluralities of arms 132 and 134 may be interconnected by an annular web of material 131 to assist in the flow of material within a manufacturing mold. The radially outermost ends of proximate pairs of arms in the first plurality of arms 132, e.g., 132a/132b, 132b/132c, etc. are separated by an arcuate spacing α, where α=(2πr)/$n_T$ and $n_T$ is the total number of arms in the plurality of arms 132. Similarly, the radially outermost ends of proximate pairs of arms in the second plurality of arms 134, e.g., 134a/134b, 134b/134c, etc. are separated by the same arcuate spacing α. However, the radially outermost ends of proximate arms between the first and second plurality of arms 132 and 134, e.g., 132a/134a, are angularly offset, i.e., offset with respect to the axis of rotation 152, by an angular spacing β such that arms from the respective pluralities alternate about the pulley, with proximate arms between the respective pluralities of arms 132 and 134 having an arcuate separation (neglecting any lateral component) of one half of the arcuate spacing, or α/2. Consequently, the outer rim 140 is alternately supported, on opposite sides of the lateral midline 150, by arms 132a, 134a, 132b, 134b, etc. It is believed that if the first and second pluralities of arms 132 and 134 tend to cause vibrations, the angular offset between the respective pluralities tends to generate out-of-phase vibration components which destructively interfere with each other and reduce the amplitude of any resonance, so as to reduce or obscure any distinct/distinguishable drive system noise.

Figure 3:
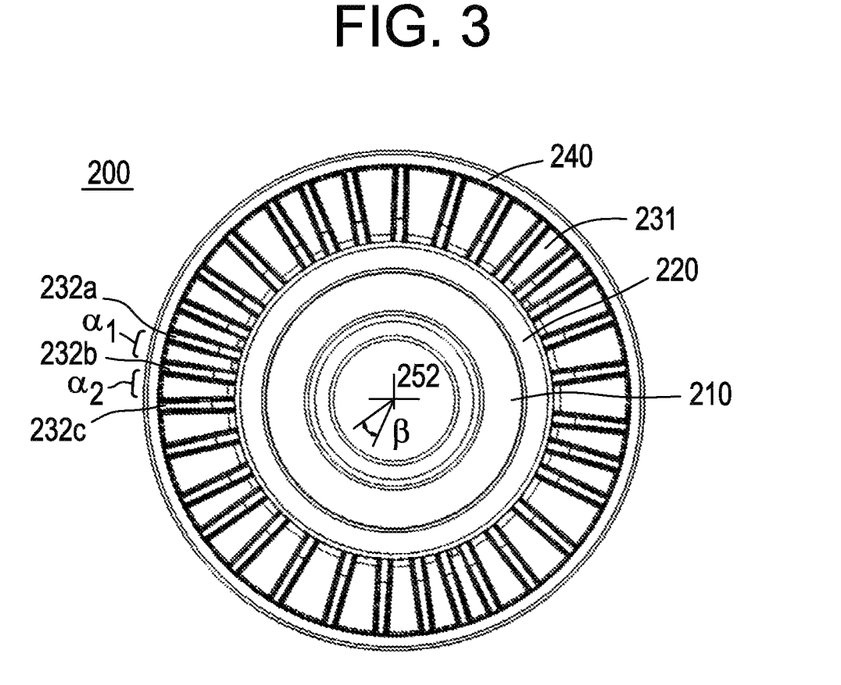
FIG. 3 is a side view of an arm design pulley having arms which support the outer rim with varying arcuate spacings. An annular web is shaded to emphasize the spacing of the arms.

In a second embodiment shown in FIG. 3, a pulley with reduced rotational symmetry 200 disrupts the aforementioned vibration by varying the arcuate spacing of the radially outermost ends of the arms. The pulley 200 comprises an outer hub 220, a plurality of arms 232, and an outer rim 240. The pulley may include or receive an inner hub 210, such as the inner hub 10 discussed in the known design, but the particular construction of the inner hub 210 is not a critical limitation. The plurality of arms 232 (including individual arms 232a, 232b, etc.) extend radially from the outer hub 220 to the outer rim 240. The plurality of arms 232 preferably constitutes a plurality of ribs which are oriented perpendicularly to a lateral midline of the pulley, but the arms may have other shapes, cross-sections, and orientations as well. The pluralities of arms 232 and 234 may be interconnected by an annular web of material 231 to assist in the flow of material within a manufacturing mold. The radially outermost ends of proximate pairs of arms, e.g., 232a/232b, 232b/232c, etc., are separated by varying arcuate spacings to reduce rotational symmetry around the axis of rotation 252. In a preferred embodiment, the varying arcuate spacings reflect any one of the pitch sequences disclosed in U.S. Pat. No. 2,878,852, the entirety of which is incorporated herein by reference. These pitch sequences describe pseudo-random patterns of relative spacings which may be converted into arcuate spacings between proximate pairs of arms in an arm design pulley. For example, in a design in which the plurality of arms 232 consists of thirty two ribs, there are thirty two proximate pairs of ribs, and the relative spacing can vary according to the sequence $X_n$={9, 10, 11, 12, 10, 11, 12, 13, 12, 11, 10, 9, 11, 12, 13, 10, 10, 13, 12, 11, 9, 10, 11, 12, 13 12, 11, 10, 12, 11, 10, 9}, where n is an integer 1 through $n_T$ representing, in order, the first through thirty second possible proximate pairs, and $n_T$ is the total number of arms (thirty two). The sequence of arcuate spacing an is determinable as $\alpha_n=(2\pi r X_n)/X_T$, where $X_T$ is the sum of the members of $X_n$. Thus, the outer rim 240 is supported at varying arcuate spacings by the plurality of arms 232, and the pulley has no rotational symmetry about axis of rotation 252. The number of arms in the plurality of arms can, of course, be a lesser or greater number within the bounds of reason. The exemplary pitch sequence, and other pitch sequences devised according to the rules laid out in the referenced patent, do not have the significant repeating characteristic necessary to cause vibrations (excepting, of course, repetition caused by a complete revolution of the pulley itself). It is believed that in typical operating environments, particularly automotive and heavy machinery applications, use of such pitch sequences will shift any noise component to a less distinguishable or potentially inaudible range of frequencies, and redistribute the radiated energy across multiple and/or more complex modes of vibration to better approximate a frequency-distributed noise spectrum. Although such sequences enable the elimination of rotational symmetry, it will be appreciated that less extensive sequences may be employed to reduce rotational symmetry, e.g., a pitch sequence may be repeated so as to produce a two-fold or multi-fold rotational symmetry, in circumstances where the elimination of rotational symmetry is not required to achieve satisfactory noise reduction.

Figure 4:
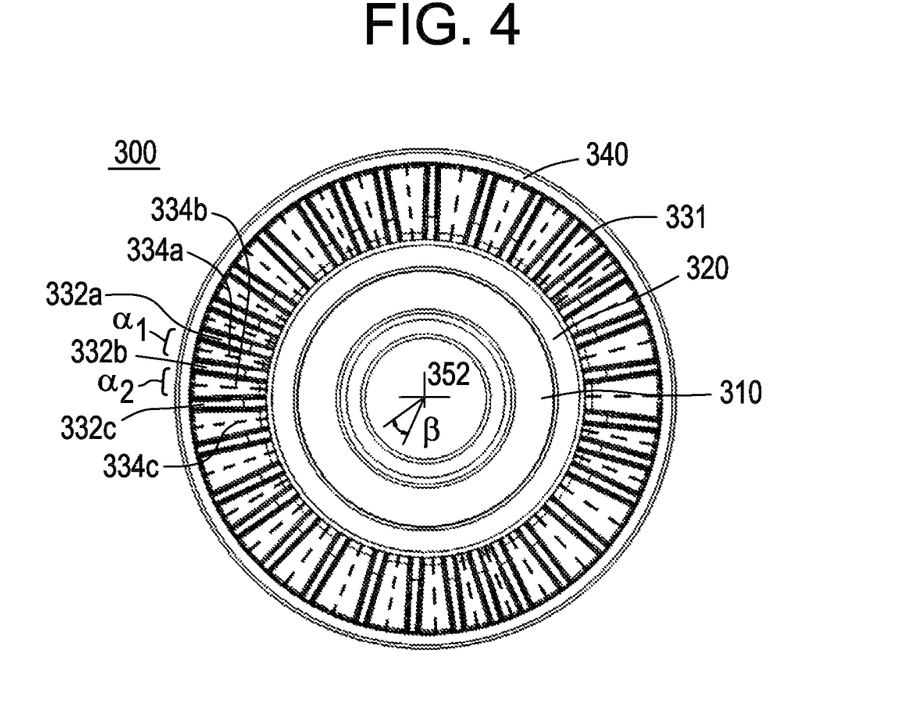
FIG. 4 is a side view of an arm design pulley having arms which support the outer rim with varying arcuate spacings, and arms which are angularly offset across the lateral midline of the pulley. An annular web is shaded to emphasize the spacing of the arms on the facing side, and the positions of arms on the opposite side of the pulley are indicated by single phantom lines.

In a third embodiment shown in FIG. 4, a pulley 300 disrupts the aforementioned vibration by combining the laterally asymmetric characteristic of the first embodiment with the reduced rotational symmetry of the second embodiment. The pulley 300 comprises an outer hub 320, a first plurality of arms 332, a second plurality of arms 334 equal in number to the first plurality of arms, and an outer rim 340. The pulley may include or receive an inner hub 310, such as the inner hub 10 discussed in the known design, but the particular construction of the inner hub 310 is not a critical limitation. The first plurality of arms 332 (including individual arms 332a, 332b, etc.) extend radially from the outer hub 320 to the outer rim 340, with their radially outermost ends being centered on one side of the lateral midline of the pulley. The second plurality of arms 334 (including individual arms 334a, 334b, etc.) also extend radially from the outer hub 320 to the outer rim 340, with their radially outermost ends being centered on the opposite side of the lateral midline 350. The pluralities of arms 332 and 334 preferably constitute pluralities of ribs which are oriented perpendicularly to the lateral midline 350, but the arms may have other shapes, cross-sections, and orientations as well. The pluralities of arms 332 and 334 may be interconnected by an annular web of material 331 to assist in the flow of material within a manufacturing mold. The radially outermost ends of proximate pairs of arms in the first plurality of arms 332, e.g., 332a/332b, 332b/332c, etc. are separated by a sequence of varying arcuate spacings, $\alpha_n$, such as that specified above. The radially outermost ends of proximate pairs of arms in the second plurality of arms 334, e.g., 334a/334b, 334b/334c, etc. may be separated by the same sequence of varying arcuate spacings, $\alpha_n$, but with the radially outermost ends of proximate pairs of arms between the first and second plurality of arms 332 and 334, e.g., 332a/334a, being angularly offset by an angular spacing β, and preferably by an angular spacing β such that arms in the second plurality of arms are separated from the arms in the nearest proximate pair of arms in the first plurality of arms by an equal arcuate separation (neglecting any lateral component). However, the radially outermost ends of proximate pairs of arms in the second plurality of arms 334 may instead be separated by an alternate sequence of varying arcuate spacings, similar to that described above, to introduce further disorder into the pulley.

Figure 5A:
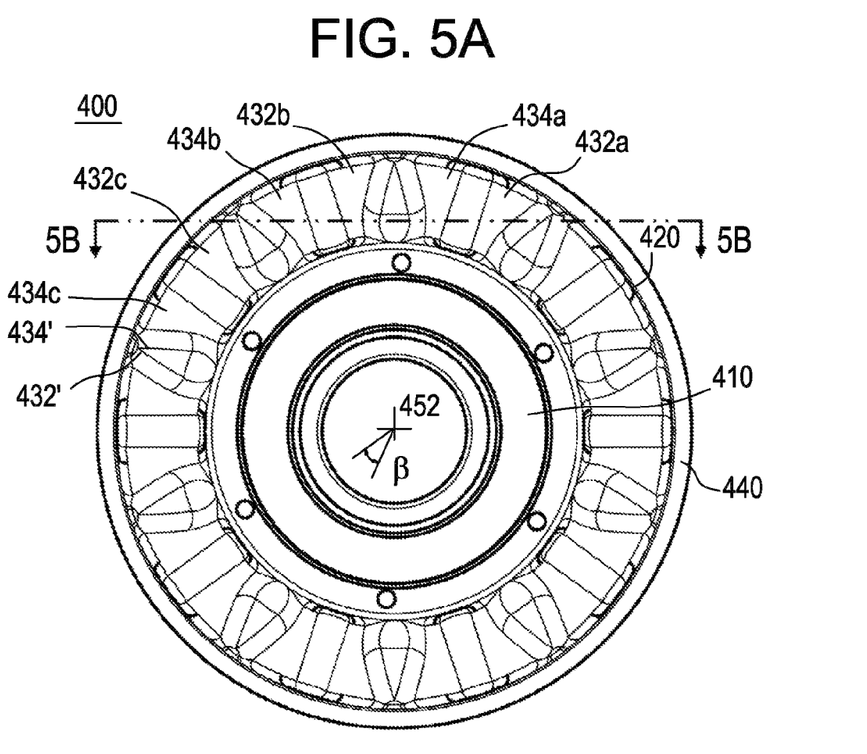
FIG. 5A is a side view of an arm design pulley having arms which are angularly offset and oppositely canted across the lateral midline of the pulley. The arms may optionally, as shown, be joined to form an undulating support structure.
Figure 5B:
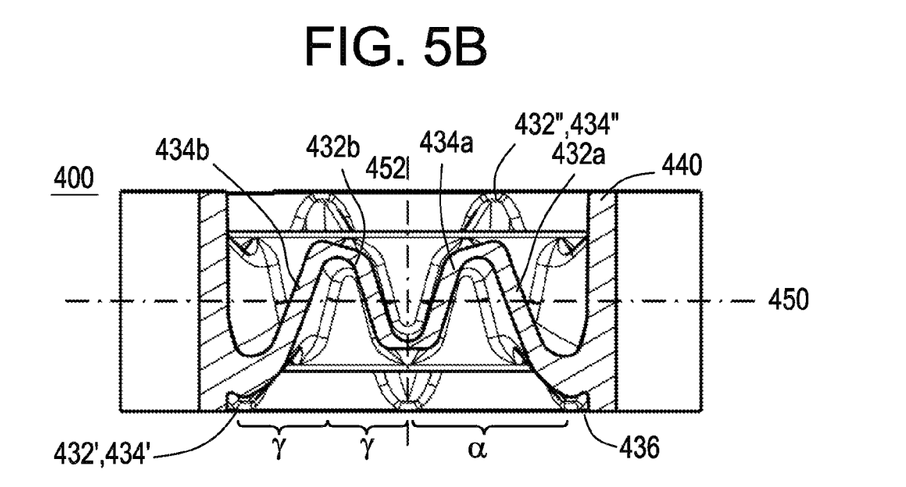
FIG. 5B is a cross-sectional view of the arm design pulley of FIG. 5A.
Figure 5C:
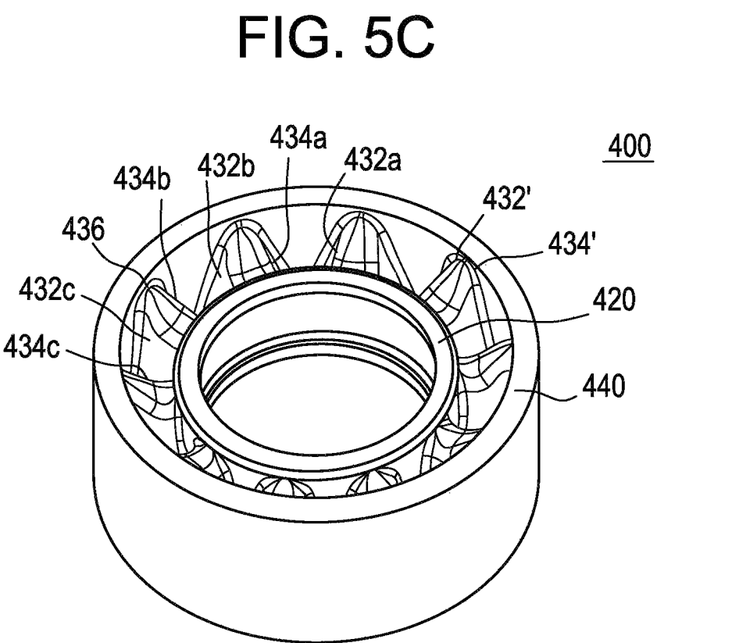
FIG. 5C is a perspective view of the arm design pulley of FIG. 5A. The inner hub 410 is omitted for sake of clarity.

In a fourth embodiment shown in FIGS. 5A-5C, a laterally asymmetric pulley 400 disrupts the aforementioned vibration by including two sets of angularly offset arms, each being oppositely canted with respect to the lateral midline of the pulley. The pulley 400 comprises an outer hub 420, a first plurality of arms 432, a second plurality of arms 434 equal in number to the first plurality of arms, and an outer rim 440. The pulley may include or receive an inner hub 410, such as the inner hub 10 discussed in the known design, but the particular construction of the inner hub 410 is not a critical limitation. The first plurality of arms 432 (including individual arms 432a, 432b, etc.) extend radially from the outer hub 420 to the outer rim 440, and are oriented so as to be canted (non-perpendicular) with respect to a lateral midline 450 of the pulley. The second plurality of arms 434 (including individual arms 434a, 434b, etc.) also extend radially from the outer hub 420 to the outer rim 440, and are oriented so as to be oppositely canted (non-perpendicular) with respect to the lateral midline 450. The first and second pluralities of arms 432 and 434 are angularly offset such that arms from the respective pluralities alternate with each other about axis of rotation 452 of the pulley. The pluralities of arms 432 and 434 preferably constitute pluralities of sheet-like ribs, but may have other laterally elongated cross sections. The lateral ends 432', 432" of individual arms in the first plurality of arms 432 may be joined to the proximate lateral ends 434', 434" of individual arms in the second plurality of arms 434 to form an undulating support structure lacking inter-arm voids. The alternating, generally V-shaped pattern formed by the offset pluralities of arms 432 and 434 has similar advantages to the design of the first embodiment. The radially and laterally outermost ends 432' or 434' of proximate pairs of arms in each respective plurality of arms 432, 434, e.g., 432a/432b, 434a/434b, etc. are separated by an equal arcuate spacing α, where $\alpha=(2\pi r)/n_T$, and $n_T$ is the total number of arms in either plurality of arms 432 or 434. The radially and laterally outermost ends 432" or 434" of proximate pairs of arms in each respective plurality of arms 432, 434 will be also separated by an equal arcuate spacing by virtue of the arms 432 and 434 being oppositely canted. Significantly, the vertices 436 of V shapes defined by the radially and laterally outermost ends of proximate pairs of arms between the respective pluralities 432 and 434 (actual if such lateral ends are joined, projected if such lateral ends are unjoined), e.g., at the intersection of 432a/434a, 434a/432b, 432b/434b, etc, will be offset with respect to the axis of rotation 452 by an arcuate spacing, γ, where γ=α/2, and disposed on opposite sides of the lateral midline 450. Thus, if these regularly spaced-apart features tend to cause vibrations, the offset tends to generate out-of-phase vibration components which destructively interfere with and reduce the amplitude of any resonance. In addition, the canted orientations of the pluralities of arms 432 and 434 alter the orientation of any molding-induced variation in the radius of the running surface 442 of the outer rim 440. Any slight ridges or depressions formed over the arms 432 and 434 due to the molding process will be canted with respect to an entering/exiting drive belt, rather than being perpendicular to the drive belt. It is believed that defects in the radius of the running surface that are isolated to minor portions of the lateral extent of the running surface are far less likely to cause or contribute to vibration than defects in the radius of the running surface which extend across all or the majority of the lateral extent of any particular cross section. This can be attributed in part to the elasticity and flexibility of the belt material, which will allow laterally adjacent portions of the belt to deform over protrusions so as to contact the majority portion of the running surface 442 having the proper radius. Finally, the canted orientations of the pluralities of arms 432 and 434 alter the angular spacing between the radially outermost ends of proximate pairs of arms between the respective pluralities of arms 434 and 434, e.g., between 432a/434a, 434a/432b, 432b/434b, etc., across the lateral extent of the running surface 442. It is believed that this lateral variation in angular spacing will confound vibrations, and tend, if causing substantial vibration at all, to generate a disorganized spectrum of vibrations which are unlikely to establish an audible resonance.

Figure 6A:
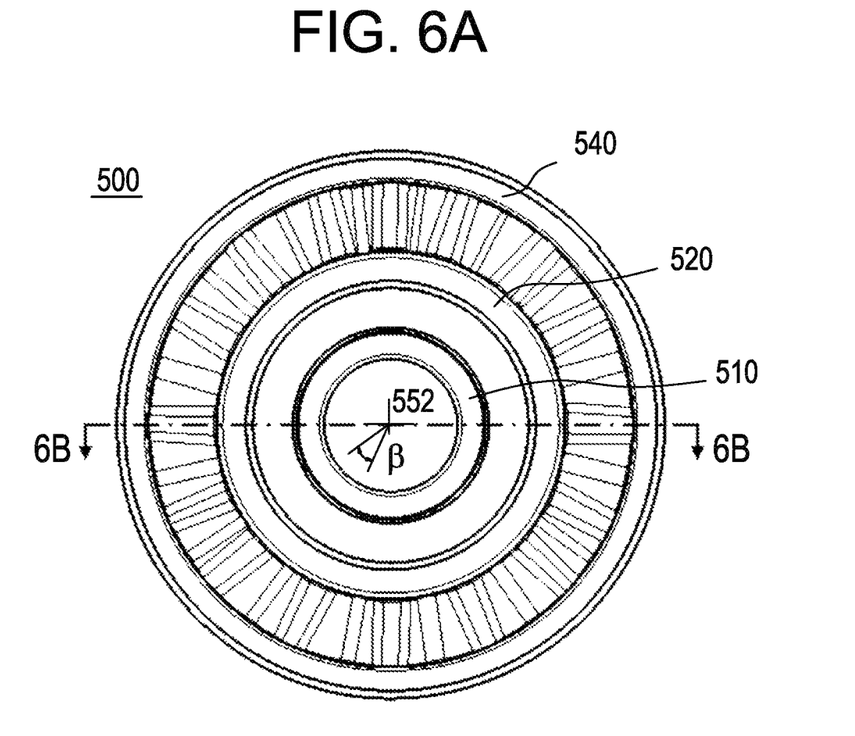
FIG. 6A is a side view of an arm design pulley having arms which are angularly offset and oppositely canted across the lateral midline of the pulley, where the canting has been varied so as to vary the arcuate spacing of vertices defined by the radially outermost ends of proximate pairs of arms.
Figure 6B:
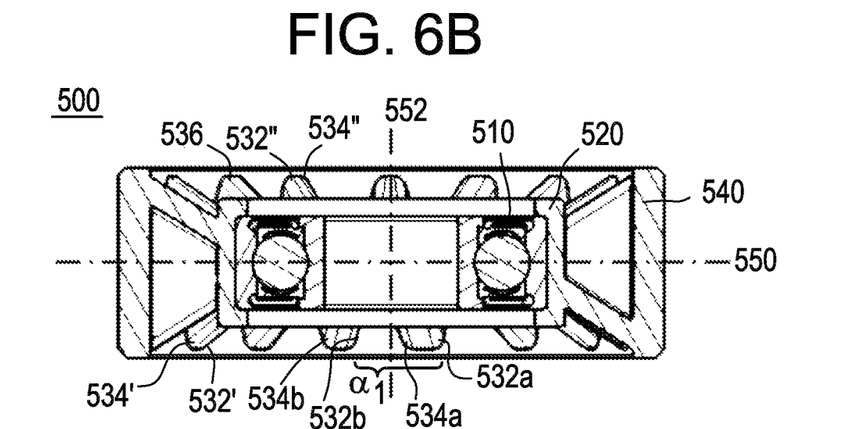
FIG. 6B is a cross-sectional view of the arm design pulley of FIG. 6A.
Figure 6C:
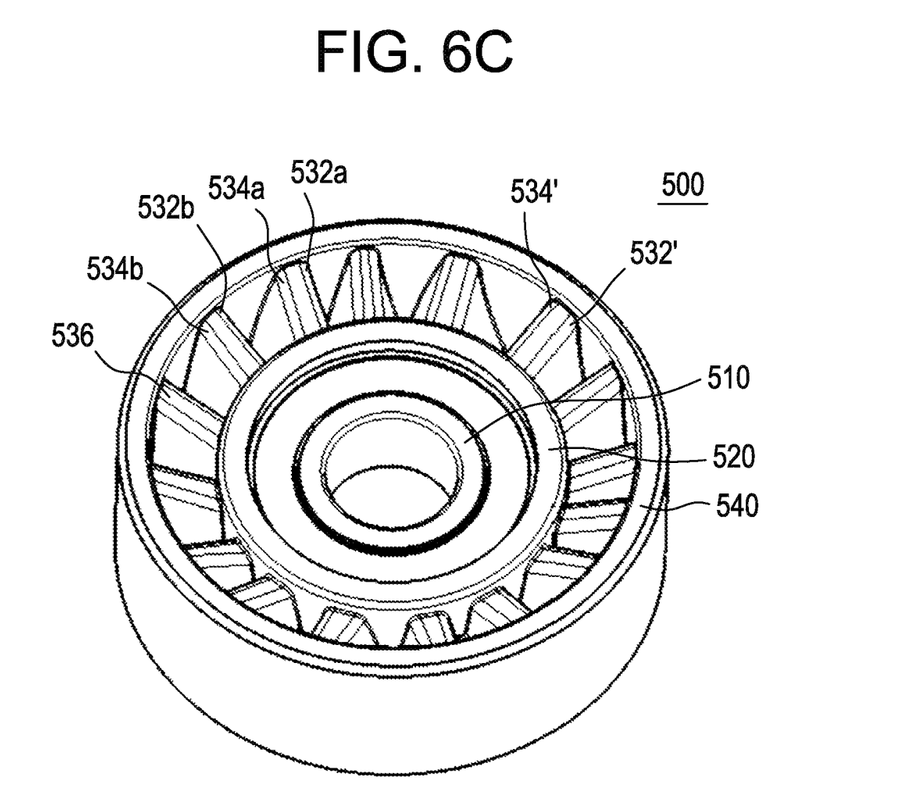
FIG. 6C is a perspective view of the arm design pulley of FIG. 6A.

In a fifth embodiment shown in FIGS. 6A-6C, a laterally asymmetric pulley 500 disrupts the aforementioned vibration by combining the laterally asymmetric characteristic of the fourth embodiment with the reduced rotational symmetry of the second embodiment. The pulley 500 comprises an outer hub 520, a first plurality of arms 532, a second plurality of arms 534 equal in number to the first plurality of arms, and an outer rim 540. The pulley may include or receive an inner hub 510, such as the inner hub 10 discussed in the known design, but the particular construction of the inner hub 510 is not a critical limitation. The first plurality of arms 532 (including individual arms 532a, 532b, etc.) extend radially from the outer hub 520 to the outer rim 540, and are oriented so as to be canted with respect to the lateral midline 550 of the pulley. The second plurality of arms 534 (including individual arms 534a, 534b, etc.) also extend radially from the outer hub 520 to the outer rim 540, and are oriented so as to be approximately oppositely canted with respect to the lateral midline 550. For the sake of clarity, and as further explained below, the degree of canting is similar but not identical so as to vary the arcuate spacing γ between vertices 536. The first and second pluralities of arms 532 and 534 are angularly offset such that arms from the respective pluralities alternate with each other about the pulley. The pluralities of arms 532 and 534 preferably constitute pluralities of sheet-like ribs, but may have other laterally elongated cross sections. The lateral ends 532', 532" of individual arms in the first plurality of arms 532 may be joined to the proximate lateral ends 534', 534" of individual arms in the second plurality of arms 534 to form an undulating support structure lacking inter-arm voids. The alternating, generally V-shaped pattern formed by the offset pluralities of arms 532 and 534 is structured so as to eliminate the rotational symmetry of the pulley 500. Specifically, the canting of individual arms is varied so as to vary the arcuate spacings between the radially and laterally outermost ends 532' or 534' of proximate pairs of arms in each respective plurality of arms 532, 534, e.g., 532a/532b, 534a/534b, etc. on one side of the lateral midline of the pulley 550 to reduce rotational symmetry around the axis of rotation 552. In a preferred embodiment, the varying arcuate spacings reflect any one of the pitch sequences disclosed in U.S. Pat. No. 2,878,852. For example, in a design in which the first and second pluralities of arms each consist of sixteen ribs, there are sixteen proximate pairs of ribs in each plurality, and the arcuate spacing, $\alpha_n$, can vary based on the relative spacings in the sequence $X_n$={9, 10, 11, 12, 10, 11, 12, 13, 12, 11, 10, 9, 11, 12, 13, 10}, where n is an integer 1 through $n_T$ representing, in order, the first through sixteenth possible proximate pairs, and $n_T$ is the total number of arms (sixteen). The canting of individual arms also varies the arcuate spacings between the radially and laterally outermost ends 532" or 534" of proximate pairs of arms in each respective plurality of arms 532, 534 on the opposite side of the lateral midline of the pulley 550. The arcuate spacing may vary according to the same pitch sequence, but with the radially and laterally outermost ends 532" or 534" of proximate pairs of arms on the opposite side of the lateral midline 550 being offset from the radially and laterally outermost ends 532' or 534' of the pairs on the first side by an angular spacing β. Significantly, the vertices 536 of V shapes defined by the radially and laterally outermost ends of proximate pairs of arms between the respective pluralities 532 and 534 (actual if such lateral ends are joined, projected if such lateral ends are unjoined), e.g., at the intersection of 532a/534a, 534a/532b, 532b/534b, etc, will have varying arcuate separations and be offset with respect to the axis of rotation 552 by varying angular spacings if different pitch sequences are used, or by angular spacing β if the same pitch sequence is used. Thus, if these features, forming the stiffest portion of the outer rim 540, tend to cause vibrations, the offset and potentially pseudo-random nature of the spacing of the vertices 536 will tend to confound the generation of any recurring vibration which may be perceived as a distinct noise component or which may contribute to a resonance.

Figure 7A:
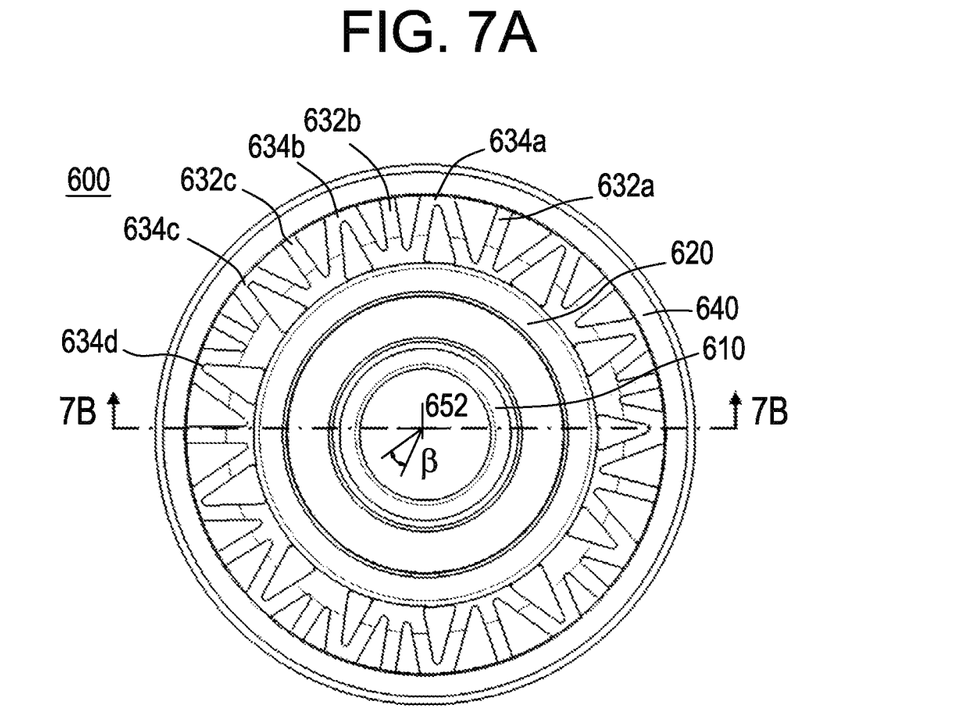
FIG. 7A is a side view of an arm design pulley having two differently constructed sets of arms which support the outer rim with varying arcuate spacings.
Figure 7B:
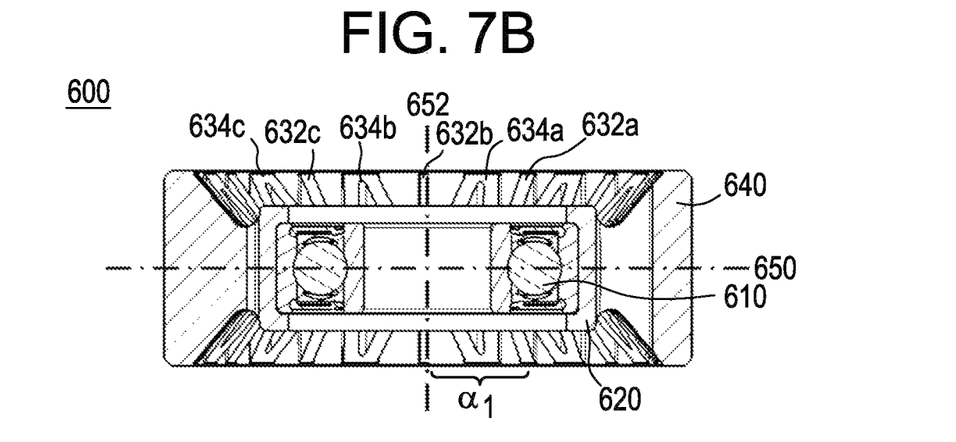
FIG. 7B is a cross-sectional view of the arm design pulley of FIG. 7A.

Finally, the applicants note that the pulleys disclosed herein need not employ only a single plurality of structurally identical arms or two pluralities of essentially structurally identical arms configured in approximately oppositely disposed manners. In a final exemplary embodiment shown in FIGS. 7A and 7B, a pulley with reduced rotational symmetry 600 disrupts vibration by varying the arcuate spacing of the radially outermost ends of two pluralities of arms, 632 and 634, with differing constructions. The pulley 600 comprises an outer hub 620, the aforementioned pluralities of arms 632 and 634, and an outer rim 640. The pulley may include or receive an inner hub 610, such as the inner hub 10 discussed in the known design, but the particular construction of the inner hub 610 is not a critical limitation. In one variation, the radially outermost ends of the arms of a first plurality of arms 632 may be comparatively thin or rib-like with respect to the direction of rotation, and the radially outermost ends of the arms of the second plurality of arms 634 may be comparatively thick or strut-like with respect to the direction of rotation. In the same or another variation, the arms of the first plurality of arms 632 may be unitary, while the arms of the second plurality of arms 634 may be inwardly bifurcated. The plurality of arms 632 preferably constitutes a plurality of unitary ribs which are oriented perpendicularly to a lateral midline 650 of the pulley, and the plurality of arms 634 preferably constitutes a plurality of inwardly bifurcated struts which are oriented perpendicularly to the lateral midline 650 of the pulley, but the arms may have other shapes, cross-sections, and orientations as well. The pluralities of arms 632 and 634 may be interconnected by an annular web of material (not shown) to assist in the flow of material within a manufacturing mold. The radially outermost ends of proximate pairs of arms in the first plurality of arms 632, e.g., 632a/632b, 632b/632c, etc., are separated by varying arcuate spacings to reduce rotational symmetry around the axis of rotation 652. For example, in a design in which the first plurality of arms 632 consists of thirteen ribs, there are thirteen proximate pairs of ribs, and the arcuate spacing, $\alpha_n$, can vary based on the relative spacings of a pitch sequence, $X_n$, determined according to the methods disclosed in U.S. Pat. No. 2,878,852 for $n_T=13$ arms. The radially outermost ends of proximate pairs of arms in the second plurality of arms 634, e.g., 634a/634b, 634b/634c, 634c/634d, etc., may be separated by the same sequence of varying arcuate spacings, $\alpha_n$, but with the radially outermost ends of proximate pairs of arms between the first and second plurality of arms 632 and 634, e.g., 632a/634a, being angularly offset by an angular spacing $\beta$, and preferably by an angular spacing $\beta$ such that arms in the second plurality of arms are separated from the arms in the nearest proximate pair of arms in the first plurality of arms by an equal arcuate separation (neglecting any lateral component). However, in variations the radially outermost ends of proximate pairs of arms in the second plurality of arms 334 may instead be separated by an alternate sequence of varying arcuate spacings, similar to that described above. This is particularly desirable if multiple arms of a first plurality of arms 632 are disposed between proximate pairs of arms in a second plurality of arms 634, e.g., if every other arm 634b, 634d, etc. were to be omitted from the illustrated embodiment. In further variations, additional pluralities of arms, structurally identical or essentially structurally identical to the first or second pluralities of arms, or having differing constructions from either, may be present in addition to the described first and second pluralities of arms.

The pulleys disclosed generally herein may be constructed from any suitable material, including metals such as low alloy steel and 356 aluminum alloy, and by any suitable process, such as extrusion or forging followed by precision machining. The embodiments and methods described herein are particularly applicable to pulleys made from thermoplastics, thermosetting plastics, or moldable plastic composites, and constructed by molding processes such as an injection molding process. The potential for greater deformation and rebound in the running surface of molded polymer pulleys, combined with the effects of mold shrinkage at rim structures such as the arm-to-rim joints, make molded polymer pulleys particularly susceptible to the unintended generation of noise having a distinct mechanical component with a distinguishable audible pitch.

While the present pulleys and methods have been illustrated in various aspects, including particular embodiments, variants, and expressions thereof, it is not the intent of the applicants to restrict or limit the spirit and scope of their claims to such detail. Numerous other variations, changes, and substitutions will occur to those skilled in the art without departing from the scope of the claimed invention. It will be understood that the foregoing description is provided by way of example, and that other modifications may occur to those skilled in the art without departing from the scope and spirit of the disclosure.

What is claimed is:

1. A pulley for an endless belt drive system, the pulley comprising:
    a hub including an outer hub;
    an outer rim; and
    first and second pluralities of arms extending radially outward from the outer hub to the outer rim, the first and second pluralities being equal in number, wherein the radially and laterally outermost ends of the arms of the first and second pluralities of arms are, respectively, arcuately spaced apart about the outer rim;
    wherein the arms of the second plurality of arms are angularly offset from the arms of the first plurality of arms about the axis of rotation of the pulley; wherein the arms of the first plurality of arms are canted with respect to a lateral midline of the pulley, and the arms of the second plurality of arms are approximately oppositely canted with respect to the lateral midline; wherein the arms of the first plurality of arms alternate with the arms of the second plurality of arms about the axis of rotation of the pulley; and wherein the radially and laterally outermost ends of the arms of the first and second pluralities of arms are, respectively, arcuately spaced apart according to a pitch sequence describing a pseudo-random pattern of relative spacings.

2. The pulley of claim 1, wherein V shapes are defined by the radially and laterally outermost ends of proximate pairs of arms between the first and second pluralities of arms, and the vertices of proximate V shapes are both offset with respect to the axis of rotation and disposed on opposite sides of the lateral midline of the pulley.

3. The pulley of claim 2, wherein the lateral ends of the arms of the first plurality of arms are joined to the proximate lateral ends of the arms of the second plurality of arms.

4. The pulley of claim 1, wherein the radially and laterally outermost ends of proximate pairs of arms of the first plurality of arms are arcuately spaced apart according to the pitch sequence, and the radially and laterally outermost ends of proximate pairs of arms of the second plurality of arms are arcuately spaced apart according to the same pitch sequence.

5. The pulley of claim 4, wherein the first plurality of arms consists of sixteen arms, the second plurality of arms consists of sixteen arms, and the pitch sequence is $X_n=\{9, 10, 11, 12, 10, 11, 12, 13, 12, 11, 10, 9, 11, 12, 13, 10\}$, where n is an integer 1 through 16 representing, in order, first through sixteenth possible proximate pairs of arms.

6. The pulley of claim 1, wherein the pitch sequence is repeated within the circumference of the outer rim.

7. The pulley of claim 1, wherein the pitch sequence eliminates the rotational symmetry of the pulley about the axis of rotation of the pulley.

8. The pulley of claim 1, wherein the pitch sequence includes at least three successive relative spacings, and the three successive relative spacings differ from each other by at least four percent of the smallest relative spacing.

9. The pulley of claim 8, wherein the pitch sequence includes at least four successive relative spacings, and the difference between a maximum and minimum relative spacing of the four successive relative spacings is at least sixteen percent of the average relative spacing of the four successive relative spacings.

10. The pulley of claim 9, wherein within any portion of the pitch sequence representing one fifth of the circumference of the outer rim, the average spacing of the relative spacings is within five percent of that of any other sequence of relative spacings present about the circumference of the outer rim.

11. A method of constructing a low-noise pulley comprising the steps of:
constructing a hub, including an outer hub, and an outer rim;
constructing first and second pluralities of arms connecting the outer hub to the outer rim, the first and second pluralities being equal in number, wherein the radially and laterally outermost ends of the arms of the first and second pluralities of arms are, respectively, arcuately spaced apart about the outer rim;
angularly offsetting the arms of the second plurality of arms from the arms of the first plurality of arms about the axis of rotation to eliminate lateral symmetry across a lateral midline of the pulley;
angularly canting the arms of the first plurality of arms with respect to the lateral midline, as well as approximately oppositely angularly canting the arms of the second plurality of arms with respect to the lateral midline, wherein the arms of the first plurality of arms alternate with the arms of the second plurality of arms about the axis of rotation of the pulley; and
arcuately spacing apart the radially and laterally outermost ends of the arms of the first plurality of arms according to a pitch sequence describing a pseudo-random pattern of relative spacings, and arcuately spacing apart the radially and laterally outermost ends of the arms of the second plurality of arms according to the same or another pitch sequence describing a pseudo-random pattern of relative spacings.

12. The method of claim 11, wherein V shapes are defined by the radially and laterally outermost ends of proximate pairs of arms between the first and second pluralities of arms, and the vertices of proximate V shapes are both offset with respect to the axis of rotation and disposed on opposite sides of the lateral midline of the pulley.

13. The method of claim 12, further comprising the step of joining the lateral ends of the arms of the first plurality of arms to the proximate lateral ends of the arms of the second plurality of arms.

14. The method of claim 11, wherein the radially and laterally outermost ends of proximate pairs of arms of the first plurality of arms are arcuately spaced apart according to the pitch sequence, and the radially and laterally outermost ends of proximate pairs of arms of the second plurality of arms are arcuately spaced apart according to the same pitch sequence.

15. The method of claim 11, wherein the pitch sequence includes at least three successive relative spacings, and the three successive relative spacings differ from each other by at least four percent of the smallest relative spacing.

16. The method of claim 15, wherein the pitch sequence includes at least four successive relative spacings, and the difference between a maximum and minimum relative spacing of the four successive relative spacings is at least sixteen percent of the average relative spacing of the four successive relative spacings.

17. The method of claim 16, wherein within any portion of the pitch sequence representing one fifth of the circumference of the outer rim, the average spacing of the relative spacings is within five percent of that of any other sequence of relative spacings present about the circumference of the outer rim.

18. The method of claim 11, wherein the first plurality of arms consists of sixteen arms, the second plurality of arms consists of sixteen arms, and the pitch sequence is $X_n=\{9, 10, 11, 12, 10, 11, 12, 13, 12, 11, 10, 9, 11, 12, 13, 10\}$, where n is an integer 1 through 16 representing, in order, first through sixteenth possible proximate pairs of arms.

19. The method of claim 11, wherein the pitch sequence is repeated within the circumference of the outer rim.

20. The method of claim 11, wherein the pitch sequence eliminates the rotational symmetry of the pulley about the axis of rotation of the pulley.

* * * * *